UNITED STATES PATENT OFFICE.

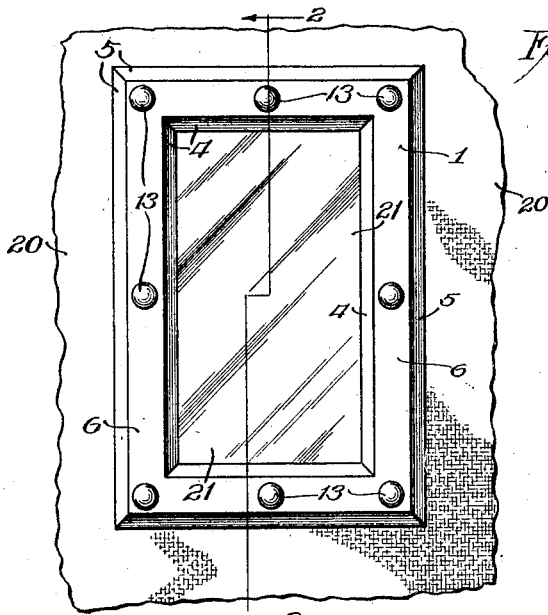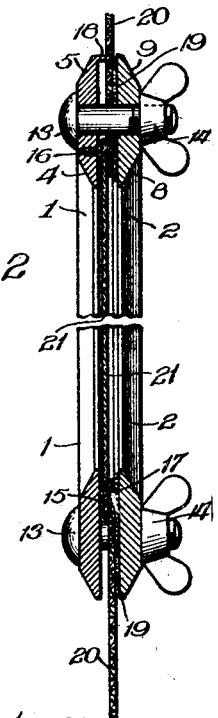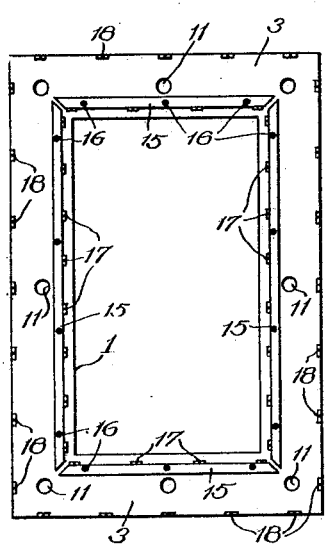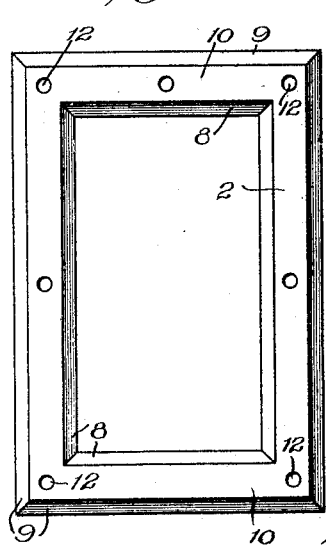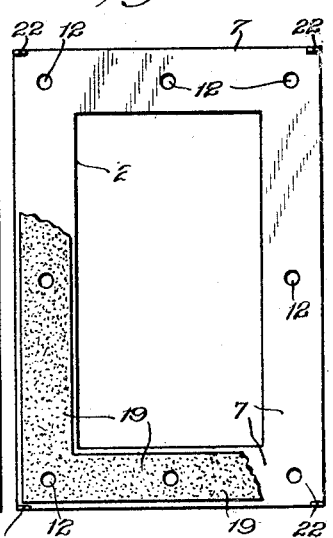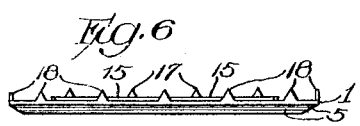

JOHN TAYLOR DENNIS, OF DETROIT, MICHIGAN.

MICA-LIGHT FRAME.

1,367,770.  Specification of Letters Patent.  Patented Feb. 8, 1921.

Application filed February 14, 1920. Serial No. 358,727.

*To all whom it may concern:*

Be it known that I, JOHN TAYLOR DENNIS, a subject of the King of England, and a resident of the city of Detroit, in the county of Wayne and State of Michigan, have invented a new and useful Improvement in Mica-Light Frames, of which the following is a full, clear, and exact description.

My invention relates to frames for mica lights suitable for use with automobile curtains and similar fabrics, and it consists in the combinations, constructions and arrangements herein described and claimed.

An object of my invention is to provide a device of the type described that can be quickly and easily applied to an automobile curtain or similar fabric, and which can be as readily detached in order to permit replacement of a broken light.

A further object of my invention is to provide a metal frame for mica lights which can be readily converted into a frame suitable for holding an ordinary glass light without making use of an auxiliary wooden frame portion.

A further object of my invention is to provide a device of the type described that can be cheaply manufactured.

Other objects and advantages will appear in the following specification, and the novel features of the invention will be particularly pointed out in the appended claims.

My invention is illustrated in the accompanying drawings, forming part of this application, in which—

Figure 1 is a face view of the device applied to an automobile curtain.

Fig. 2 is an enlarged sectional view, partly broken away, along the line 2—2 of Fig. 1, Fig. 3 is a rear view of a portion of the device, Fig. 4 is a front view of a portion of the device, Fig. 5 is a rear view, partly broken away, of the portion of the device shown in Fig. 4, and Fig. 6 is an end view of a portion of the device shown in Fig. 3.

I am aware that there are frames in common use designed to support transparent substances in automobile curtains, but I am not aware of any device embodying my invention as hereinafter set forth. Of course, it is well known that the transparent substances used as lights in automobile curtains, and supported by the frames now in general use, break very quickly on account of the nature of their service. Before my invention, I know of no device which has been invented that would be adapted to hold the lights, and which could be quickly removed in order that the broken lights might be replaced.

In carrying out my invention, I provide metal frame members 1 and 2. These frames may be of any desired form. In the embodiment of my invention, illustrated in the accompanying drawings, I have shown them as being rectangular in form. The frame member 1 has a relatively wide face portion 3, an inner edge 4, and an outer edge 5 converging to a narrow face portion 6. The frame member 2 has a relatively wide face portion 7, an inner edge 8, and an outer edge 9 converging to a narrow face 10. A pluralty of holes 11 are provided in the frame member 1, as shown in Fig. 3 of the accompanying drawings. Likewise a plurality of holes 12 are provided in the frame member 2, as shown in Figs. 4 and 5 of the accompanying drawings, and are positioned to register with the holes 11 in the frame member 1, when the wide face 3 of the frame 1 is placed against the wide face 7 of the frame 2. The holes 11 and 12 are adapted to receive bolts 13 by means of which the frame members 1 and 2 are detachably connected. Thumb nuts 14 are screwed upon the bolts 13 to adjust the frame members 1 and 2, and to hold them firmly in position.

A metal strip 15 is secured upon the face 3 of the frame member 1 near its inner edge by means of screws 16. The metal strip has integral nibs 17 perpendicular to the plane of the face 3. The face 3 of the frame 1 has integral nibs 18 spaced along its outer edge and perpendicular to the plane of the face 3. The face 7 of the frame member 2 is covered by felt 19 which is glued thereto.

From the foregoing description of the various parts of the device, the operation thereof may be readily understood. In Fig. 2 of the accompanying drawings, I have shown the device applied to the curtain 20 of an automobile, and supporting a mica light 21. The frame member 2 is held against either the outside or inside of the automobile curtain in position to inclose an opening for the mica light 21 and will be maintained in that position when integral nibs 22 that are provided upon the face portion 7 of the frame member 2 are inserted through the curtain and then clenched. The mica light 21 is now placed in position against the frame member 1. A slight pressure against the mica light will result in the nibs 17, upon the metal strip 15, penetrating the mica to hold the same in the desired position. The frame member 1, is now placed in position against the other side of the curtain from the frame member 2. The bolts 13 are inserted through the registering openings 11 and 12, and the thumb nuts 14 are screwed upon the bolts 13 to firmly hold the nibs 18 in the curtain 20 and the frame members 1 and 2 together.

It will be obvious that the device may be quickly detached in order to permit the replacement of mica lights, should the light in service become broken. The metal strip 15 may be quickly detached from the face 3 of the frame member 1, and the device will then be suitable for holding an ordinary glass light. The device, when not in use, takes up but little space, and may be carried in an ordinary tool box of an automobile.

It will also be noted that the device may be applied without the use of any tools, and be converted into a device suitable to hold an ordinary glass light by merely removing the screws 16 holding the metal strips 15 to the face 3 of the frame member 1.

The nibs 18 upon the frame member 1 are not bent after having been pressed through the curtain, and it will therefore be obvious that the frame member 1 may be quickly detached to permit replacement of a broken light while the frame member 2 remains in position.

I claim:

1. A device for a transparent sheet for an automobile curtain and like fabrics, said device comprising two separate metal frame members, each of said frame members having a relatively wide face portion and an opposite narrower face portion, integral nibs projecting substantially at right angles from the relatively wide face portion of one of the frame members and spaced along the outer edge thereof, said nibs being adapted to be inserted through the automobile curtain to detachably fasten the frame member in position, integral nibs projecting substantially at right angles from the relatively wide face portion of the second frame member and positioned near the outer corner edges thereof, said nibs being adapted to be inserted through the automobile curtain and then bent to secure said second frame member to said curtain, and means for holding said frame members clamped upon opposite sides of a transparent sheet, whereby the latter is held in position, said frame members being held with their relatively wide face portions adjacent.

2. A frame for mica lights for automobile curtains comprising two separate metal frame members, each having a relatively wide face portion and an opposite narrower face portion, integral nibs disposed along the outer edge of the relatively wide face portion of one of said frame members and projecting substantially at right angles thereto, said nibs being adapted to be inserted through the automobile curtain to detachably fasten said frame member thereto, integral nibs projecting from the relatively wide face portion of the second frame member and disposed substantially at right angles thereto, said nibs being adapted to be inserted through the automobile curtain and then bent, whereby the second frame portion is fastened to the curtain, a metal strip removably secured to the relatively wide face portion of the first named frame member along the inner edge thereof, integral nibs carried by the metal strip and adapted to be inserted through a mica light, whereby the latter is held in position, and means for clamping the frame members together, whereby the mica light and the automobile curtain are held between the relatively wide face portions of said frame members, said means comprising a plurality of bolts extending through registering bolt holes in said frame members and a thumb nut adapted to be screwed on each of said bolts.

3. A device for holding a transparent sheet and adapted to be secured to a flexible material, said device comprising two separate frame members, integral nibs projecting substantially at right angles from the face portion of one of the frame members and spaced along the outer edge thereof, said nibs being adapted to be inserted in the flexible material to detachably fasten the frame member in position, integral nibs projecting at right angles from the face portion of the second frame member and positioned near the outer corner edges thereof, said nibs being adapted to be inserted through the flexible material and then bent to secure said second named member to said flexible material, and means for holding a transparent sheet clamped between adjacent faces of said frame members.

JOHN TAYLOR DENNIS